(12) United States Patent
Rosenstock et al.

(10) Patent No.: US 9,674,654 B2
(45) Date of Patent: Jun. 6, 2017

(54) SYSTEM AND METHOD FOR IDENTIFYING A GEOMETRIC FOOTPRINT OF A POINT OF INTEREST

(75) Inventors: Jesse Matthew Rosenstock, London (GB); Jussi Petri Myllymaki, Espoo (FI)

(73) Assignee: Google Inc., Mountain View, CA (US)

( * ) Notice: Subject to any disclaimer, the term of this patent is extended or adjusted under 35 U.S.C. 154(b) by 1001 days.

(21) Appl. No.: 13/229,617

(22) Filed: Sep. 9, 2011

(65) Prior Publication Data

US 2015/0172860 A1    Jun. 18, 2015

(51) Int. Cl.
*G06F 17/30*    (2006.01)
*H04W 4/02*    (2009.01)

(52) U.S. Cl.
CPC .......... *H04W 4/021* (2013.01); *H04W 4/028* (2013.01)

(58) Field of Classification Search
USPC .................................................. 707/706, 769
See application file for complete search history.

(56) References Cited

U.S. PATENT DOCUMENTS

| | | | | |
|---|---|---|---|---|
| 7,257,570 B2* | 8/2007 | Riise | ................... | G06F 17/3087 707/706 |
| 2005/0143097 A1* | 6/2005 | Wilson | ................... | H04W 64/00 455/456.3 |
| 2011/0055204 A1* | 3/2011 | Jung | ................. | G06F 17/30241 707/722 |
| 2011/0087749 A1* | 4/2011 | Swink | ..................... | H04L 51/32 709/206 |
| 2011/0117925 A1* | 5/2011 | Sampath | ............... | H04W 64/00 455/456.1 |
| 2011/0130087 A1* | 6/2011 | Cilli | .................... | H04N 21/2665 455/3.05 |
| 2011/0161130 A1* | 6/2011 | Whalin | .................. | G06Q 10/10 705/7.18 |
| 2011/0199285 A1* | 8/2011 | Kantorov | ............. | G01R 13/029 345/55 |
| 2011/0205850 A1* | 8/2011 | Annambhotla | ...... | G06Q 10/109 368/14 |
| 2012/0009900 A1* | 1/2012 | Chawla | .................. | G06Q 10/10 455/411 |

\* cited by examiner

*Primary Examiner* — Kim Nguyen
(74) *Attorney, Agent, or Firm* — Dority & Manning

(57) ABSTRACT

Systems, methods, and machine-readable media for identifying a geometric footprint of a point of interest (POI) based on location sharing events received from mobile devices are provided. The geometric footprint may be calculated based on the received location sharing events and stored in the POI listing for that POI. In one aspect, the geometric footprint may be further refined based on subsequently received location sharing events. The system, according to certain aspects, may include an interface module, a POI module, and a footprint module. The interface module may be configured to receive a location sharing event from a mobile device, the location sharing event including an event location coordinate and a POI identifier. The POI module may be configured to identify the POI listing in the database based on the POI identifier, the POI listing including a POI location coordinate. The footprint module may be configured to calculate a geometric footprint of the POI listing based on the event location coordinate and update the POI listing using the calculated geometric footprint.

20 Claims, 5 Drawing Sheets

Location Sharing Event

| POI Identifier | Event Location Coordinate |
|---|---|

POI Listing

| Unique ID |
|---|
| Name |
| Location |
| Categories |
| Event Location Coordinates |
| ... |

SYSTEM AND METHOD FOR IDENTIFYING A GEOMETRIC FOOTPRINT OF A POINT OF INTEREST

BACKGROUND

The present disclosure generally relates to location based services and, in particular, to the location of points of interest (POI).

Information about points of interest (POI) (e.g., businesses, parks, airports, universities, etc.) are often stored as listings in databases. A POI listing may include various data about a POI such as the name of the POI and a location of the POI (e.g., longitude and latitude coordinates). The database of POI listings may be used to display one or more POIs on a mapping interface or to search for one or more POIs near a particular location.

Many listings, however, do not include data about the geometric footprint of a POI. Instead, the location data in the listings only include a location coordinate of the POI that is located at some point within the actual geometric footprint of the POI (e.g., the center point of the geometric footprint).

SUMMARY

According to one aspect of the subject technology, a system for identifying a geometric footprint of a point of interest (POI) listed in a database is provided. The system may include an interface module, a POI module, and a footprint module. The interface module may be configured to receive a location sharing event from a mobile device, the location sharing event including an event location coordinate and a POI identifier. The POI module may be configured to identify the POI listing in the database based on the POI identifier, the POI listing including a POI location coordinate. The footprint module may be configured to calculate a geometric footprint of the POI listing based on the event location coordinate and update the POI listing using the calculated geometric footprint.

According to another aspect of the subject technology, a method for identifying a geometric footprint of a point of interest (POI) listing in a database is provided. The method may include receiving a location sharing event from a mobile device, the location sharing event including an event location coordinate and a POI identifier and identifying the POI listing in the database based on the POI identifier which includes a POI location coordinate. The method may include comparing the event location coordinate to the POI location coordinate to determine if the event location coordinate is within a predetermined distance of the POI location coordinate. If the event location coordinate is within the predetermined distance of the POI location coordinate, the method may also include calculating a geometric footprint of the POI listing based on the event location coordinate.

According to yet another aspect of the subject technology, a machine-readable medium including instructions stored therein, which when executed by a machine, cause the machine to perform operations for identifying a geometric footprint of a point of interest (POI) listing in a database is provided. The operations may include receiving a location sharing event, where the location sharing event includes an event location coordinate and a POI identifier. The operations may further include identifying the POI listing in the database based on the POI identifier, the POI listing comprising a POI location coordinate and comparing the event location coordinate to the POI location coordinate to determine if the event location coordinate is within a predetermined distance of the POI location coordinate. If the event location coordinate is within the predetermined distance of the POI location coordinate a geometric footprint of the POI listing may be generated based on the event location coordinate and associated with the POI listing.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIG. 1a is a conceptual block diagram illustrating a location sharing event, in accordance with one aspect of the subject technology.

FIG. 1b is a conceptual block diagram illustrating a POI listing, in accordance with one aspect of the subject technology.

DETAILED DESCRIPTION

Figure 2A:
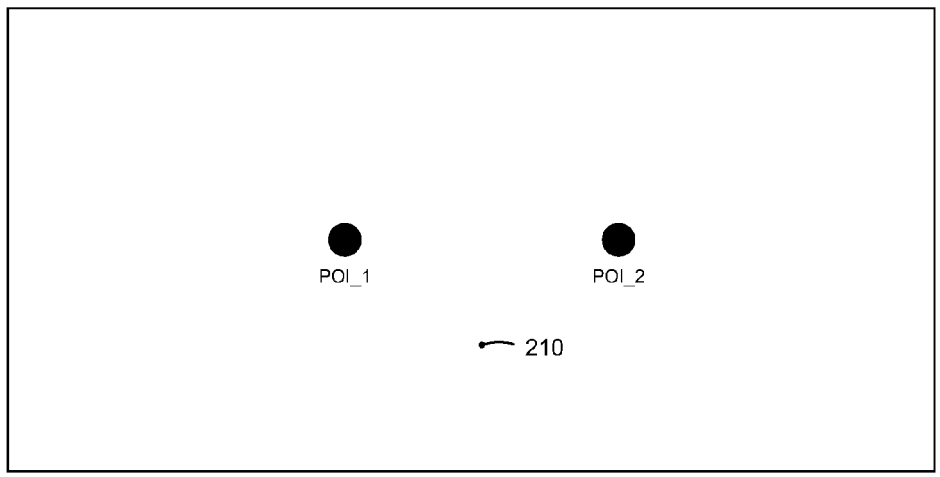
FIG. 2a illustrates a conventional scenario where no geometric foot print of a POI is known

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In accordance with various aspects of the subject technology, systems and methods for identifying a geometric footprint of a point of interest (POI) based on location sharing events received from mobile devices are provided. The geometric footprint may be calculated based on the received location sharing events and stored in the POI listing for that POI. In one aspect, the geometric footprint may be further refined based on subsequently received location sharing events.

A location sharing event may be any communication or series of communications which indicates that a user or a mobile device is at a particular location (e.g., an event location coordinate) and that location corresponds to a particular POI (e.g., a POI identifier). FIG. 1a is a conceptual block diagram illustrating a location sharing event 100, in accordance with one aspect of the subject technology. Location sharing events 100 may include, for example, a "check-in," a "snap-to-place," or any other communication that includes an event location coordinate (e.g., longitudinal and latitudinal coordinates or GPS coordinates) and a POI identifier (e.g., a POI name or other value that may be used to identify a point of interest). For example, location sharing events 100 may also include blog posts, photo posts, or status updates that are associated with a POI and tagged with a current location of a user's mobile device.

A POI listing may store information related to a POI. FIG. 1b is a conceptual block diagram illustrating a POI listing 150, in accordance with one aspect of the subject technology. A POI listing 150 may include data about a POI such as the name of the POI, the location of the POI (e.g., longitude and latitude coordinates), a unique identifier for the POI, one or more categories the POI may belong to (e.g., business, government office, shopping center, restaurant, landmark, residence, park, university, airport, neighborhood, etc.), or other information about the POI. According to one aspect, the POI listing 150 may also include one or more event location coordinates that are relevant to the POI listing 150.

Knowing the geometric footprint or boundary of a POI may be useful in many cases. For example, the geometric footprint of a POI may be displayed to a user or may be used to more accurately determine which POI a mobile user is at. Since many POIs are located next to or near each other, it may be difficult to ascertain which POI a mobile user is at without using a geometric footprint of a POI (e.g., using only the POI location coordinate). Other POIs, such as airports, parks, or universities, may cover a very large area (e.g., a square kilometer or more) and it would be helpful to know where the mobile user is within the geometric footprint of the POI or whether the mobile user is just outside the POI.

FIG. 2a illustrates a conventional scenario 200 where no geometric foot print of a POI is known. Scenario 200 shows a location coordinate of a first POI (POI_1), a location coordinate of a second POI (POI_2), and a location coordinate of a user 210. The location coordinate of the user 210 may be received as a location sharing event from the user's mobile device. For example, users of mobile devices may check in to a specific POI by transmitting their current location coordinate of the user 210 to a server. The server may generate a list of nearby POIs (e.g., POI_1 and POI_2) for the user to choose from based on the distance from the location coordinate of the user 210 to the POI location coordinates. However, it is difficult, if not impossible, to determine whether the user 210 is in the first POI, in the second POI, or in neither because there is no information on a boundary or geometric footprint of the first POI or the second POI.

Figure 2B:
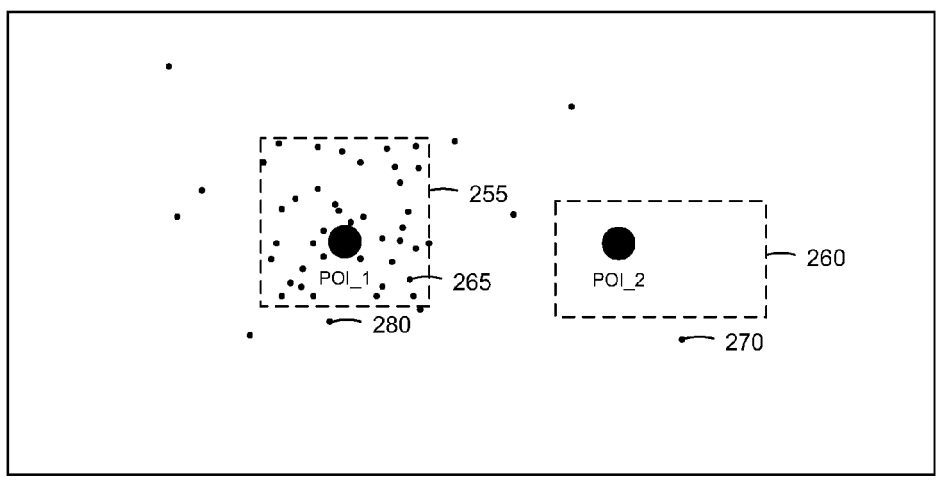
FIG. 2b illustrates a user interface displaying a map, in accordance with one aspect of the subject technology.

In contrast, FIG. 2b illustrates a scenario 250 where a geometric footprint 255 of a POI is known. Scenario 250 shows a location coordinate of a first POI (POI_1), a location coordinate of a second POI (POI_2), a geometric footprint of the first POI 255, and a geometric footprint of the second POI 260. Because the geometric footprint of the first POI 255 is known, it is possible to determine that a location coordinate 265 is within the first POI and that a location coordinate 270 is outside the first POI and the second POI. For example, if a mobile device user sends a location sharing event with the location coordinate 265, the system may recognize that the location coordinate 265 is within the first POI and automatically associate the location sharing event with the listing for the first POI. In another aspect, instead of automatically associating the location sharing event with the listing for the first POI, the system may prompt the user to confirm that the location sharing event is should be associated with the first POI or generate a list of nearby POIs with the first POI as the primary choice for the user to select.

In one aspect, a location sharing event with a event location coordinate 280 may be used to refine the geometric footprint 255 of a listing for a POI. For example, a mobile device user may send a location sharing event with the event location coordinate 280. The system may be unable to determine that event location coordinate 280 is within the geometric footprint 255 of the first POI or the second POI. As a result, the system may generate a list of nearby POIs (e.g., POI_1 and POI_2) for the user to choose from based on the distance from the event location coordinate of the user 280 to the POI location coordinates. In one aspect, if the user selects the first POI, the system may associate the event location coordinate 280 with the first POI and use the event location coordinate 280 to refine the geometric footprint of the listing for the first POI. By using new event location coordinates such as event location coordinates 280, the system may gradually refine or build out the geometric footprint for a POI listing.

In another aspect quality control operations may be performed in order to filter out event location coordinates that may be inaccurate. For example, a mobile device user may attempt to associate an event location coordinate 270 with the first POI. The system may determine that the event location coordinate 270 is an outlier (e.g., it is too far away from the first POI to be reliable). As a result, the system may filter out the event location coordinate 270 and not consider the event location coordinate 270 when refining the geometric footprint 255 of the first POI.

Figure 3:
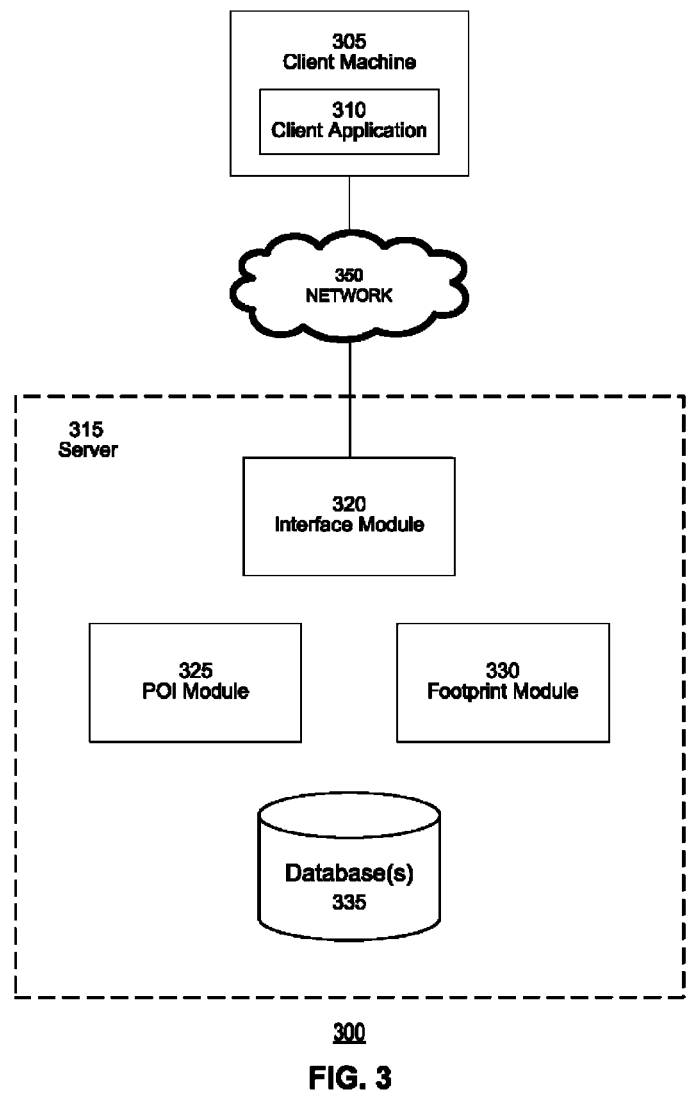
FIG. 3 is a conceptual diagram illustrating a network environment for identifying a geometric footprint of a point of interest (POI) listing in a database, in accordance with one aspect of the subject technology.

FIG. 3 is a conceptual diagram illustrating one example of a network environment 300 in which aspects of the subject technology may be implemented. The network environment 300 may include at least one server 315 and at least one client machine 305 connected over a network 350. The client machine 305 may be any machine configured to generate and transmit a location sharing event 100. For example, client machine 305 may include a mobile device (e.g., a smart phone, mobile computer, tablet computer, personal digital assistant (PDA), a global positioning system (GPS) device, etc.) configured to find out the location that the mobile device is at, generate a location sharing event 100 that includes the location, and transmit the location sharing event 100 to a server.

The client machine 305 may include one or more client applications 310 configured to generate and transmit location sharing events 100. According to one aspect, web browsers or other applications on mobile devices may be able to connect to social networking services that enable users to share their locations with friends or the public. In order to do so, the web browsers or other applications are configured to generate and transmit location sharing events 100. For example, users of mobile devices may check in to a specific POI by transmitting their current location to a server and selecting a POI to check in to from a list of nearby POIs. If the POI the user wishes to check into is not on the list of nearby POIs, the user can add the POI by inputting an identifier (e.g., the name of the POI). Once a selection of a particular POI is made and transmitted to the server, the server may check the user in and enable location sharing for the user.

The network 350 may include, for example, any one or more of a personal area network (PAN), a local area network (LAN), a campus area network (CAN), a metropolitan area network (MAN), a wide area network (WAN), a broadband network (BBN), the Internet, and the like. Further, the network 350 can include, but is not limited to, any one or more of the following network topologies, including a bus network, a star network, a ring network, a mesh network, a star-bus network, tree or hierarchical network, and the like.

The server 315 may be any system or device having a processor, a memory, and communications capability for calculating a geometric footprint of a point of interest (POI) based on location sharing events 100 received from mobile devices. In one aspect, a server 315 may be a virtual entity that might refer to a cluster or even multiple clusters of servers. In one aspect, the server 315 may include interface module 320, POI module 325, footprint module 330, and one or more databases 335. The modules illustrated in FIG. 3 may include software instructions encoded in a medium and executed by a processor, computer hardware components, or a combination of both. For example, the modules may each include one or more processors or memories that are used to perform the functions described below. According to another aspect, the various systems and modules may share one or more processors or memories.

The interface module 320 may be configured to communicate with one or more client machines or servers. For example, the interface module may receive location sharing events 100 from mobile devices. For each location sharing event 100 received, the POI module 325 may be configured to identify and locate a POI listing 150 in the database 335 based on the POI identifier in the location sharing event 100. Once the POI listing 150 in the database 335 is located, the POI module 325 may associate the event location coordinate of the location sharing event 100 with the POI listing 150. In one aspect, the POI module 325 may associate the event location coordinate with the POI listing 150 by storing the event location coordinate in the POI listing 150.

The footprint module 330 may be configured to calculate a geometric footprint of a POI listing 150 based on the event location coordinates associated with the POI listing 150 and associate the geometric footprint with the POI listing (e.g., store the geometric footprint or a reference to the geometric footprint in the POI listing). For example, event location coordinates illustrated as point 280 in FIG. 2b may be used to calculate the geometric footprint 255 of a POI listing. However, some of the event location coordinates may be outliers and may not represent accurate location coordinates. Furthermore, certain event location coordinates may be old and less reliable than recently received event location coordinates.

According to one aspect, the footprint module 330 may also perform one or more quality control operations to ensure that the most appropriate event location coordinates are used to calculate the geometric footprint of a POI listing 150. For example, the footprint module 330 may use only the most recently received event location coordinates or eliminate outlying event location coordinates that are not likely to be accurate.

The case of an airport POI listing 150 may help to illustrate the quality control operations according to one aspect of the subject technology. For example, an airport may have closed one or more terminals two weeks ago, as a result, old local sharing events 100 with event location coordinates in the closed terminals may no longer be accurate. The footprint module 330 may eliminate all event location coordinates that are over two weeks old from consideration when calculating the geometric footprint of the airport. Furthermore, a user at a long-term parking lot that is near the airport but not affiliated with the airport may transmit a location sharing event 100 associated with the airport from the parking lot. The footprint module 330 may determine that the event location coordinate of the location sharing event 100 is an outlier and should not be trusted because the event location coordinate is further away from the airport than the other received event location coordinates or because it is further from the airport than a predetermined threshold. As a result, the footprint module 330 may ignore this outlying event location coordinate and all other outlying event location coordinates when calculating the geometric footprint of the airport.

The database 335 may include one or more memories configured to store data. For example, database 335 may store, among other things, POI listings 150, location sharing events 100, associations of POI listings 150 with local sharing events 100, or associations of event location coordinates with POI listings 150. Although FIG. 3 shows the databases 335 as being in the server 315, according to one aspect, the databases 335 may be reside on one or more other servers that may communicate with the server 315 via the network 350.

Figure 4:
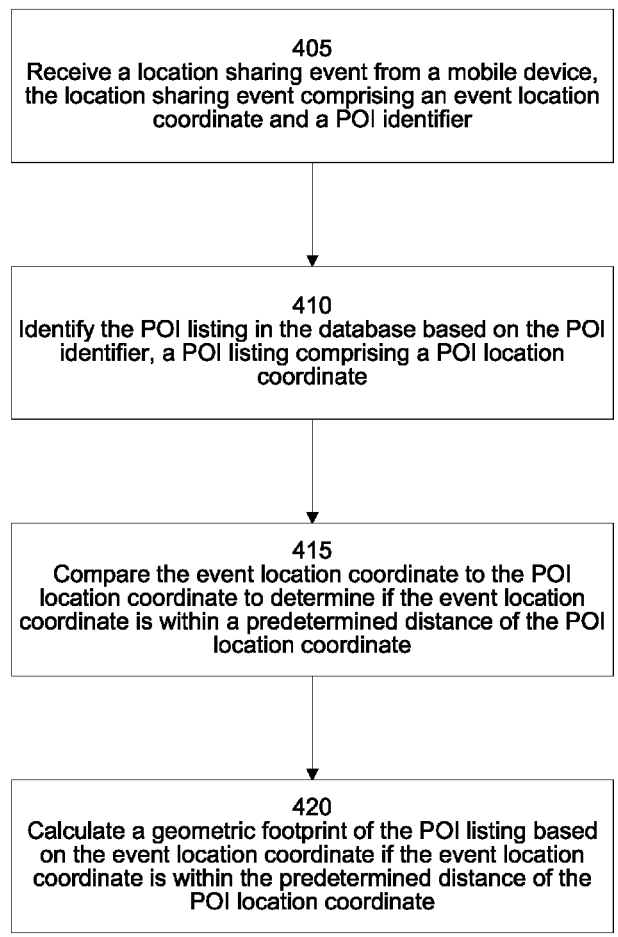
FIG. 4 is a flow chart illustrating a process for identifying a geometric footprint of a point of interest (POI) listing in a database.

FIG. 4 is a flow chart illustrating a process 400 for identifying a geometric footprint of a point of interest (POI) listing in a database. The process begins by receiving associations between location coordinates and a POI. For example, at operation 405, the interface module 320 receives one or more location sharing events 100 from one or more mobile devices. Each location sharing event 100 may include an event location coordinate representing the location of the mobile device at the time the location sharing event 100 was transmitted and a POI identifier (e.g., a name of the POI or a unique identifier of the POI) representing the POI that the mobile device was at.

At operation 410, the POI module 325 may use the POI identifier of the location sharing event 100 to identify a POI listing 150 in the database 335. As briefly mentioned above, a POI listing 150 may contain information about a POI. For example, the POI listing 150 may contain a unique identifier, a POI name, and a POI location coordinate (e.g., a GPS coordinate). In one aspect, if the POI identifier in the location sharing event 100 is a POI name, the POI module 325 may search the database 335 for POI listings 150 with the same or similar name. On the other hand, if the POI identifier is a unique identifier, the POI module 325 may search the database 335 for POI listings 150 with the same unique identifier. Once an appropriate POI listing 150 is found, the event location coordinate may be associated with the POI listing 150 by, for example, storing the event location coordinate in the POI listing 150.

In various aspects, the footprint module 330 may perform one or more quality control operations to try to ensure that only event location coordinates that are accurate are used to calculate the geometric footprint for a POI listing 150. The quality control operations may be performed before the POI module 325 associates the event location coordinates with the POI listing 150, before the geometric footprint for the POI is calculated, or some other time during the process 400.

For example, certain event location coordinates illustrated as points 270 in FIG. 2b may be outliers and may not represent accurate location coordinates for the POI listing 150. In one aspect, at operation 415, the footprint module 330 may compare the event location coordinate with the POI location coordinate to determine if the event location coordinate is within a predetermined distance of the POI location coordinate. If they are not within a predetermined distance, the location coordinates are not considered consistent and the event location coordinate is less likely to be accurate. As a result, the inconsistent event location coordinate may be ignored or removed from the POI listing 150.

If they are within a predetermined distance, the location coordinates are considered consistent and the event location coordinate is more likely to be accurate. As a result, the event location coordinate may be used to calculate the geometric footprint of the POI listing 150. For example, at operation 420, the footprint module 330 may identify all event location coordinates that are consistent with the POI location coordinate (e.g., within the predetermined distance) and use the event location coordinates to calculate the geometric footprint of the POI listing 150. After the geometric footprint is calculated, the footprint module 330 may store the geometric footprint in the POI listing 150.

In another aspect, the footprint module 330 may use the event location coordinates that are closest to the POI location coordinate to calculate the geometric footprint. For example, the footprint module 330 may identify a subset of the plurality of event location coordinates associated with the POI listing 150 that represent the event location coordinates closest to the POI location coordinate (e.g., the 150 closest event location coordinates, the event location coordinates that are among the closest 80% of all event location coordinates, etc.).

In yet another aspect, the footprint module 330 may use event location coordinates received during a particular time period (e.g., within the past 2 weeks, between a start time and an end time, or after a predetermined threshold time) to calculate the geometric footprint. For example, a location sharing event 100 received by the interface module 320 may also be associated with a timestamp or an event time indicating either a time that the location sharing event 100 was sent by the client machine 305 or a time that the location sharing event 100 was received by the interface module 320. The footprint module 330 may use only event location coordinates with an associated event time within a predetermined time period to calculate the geometric footprint for a POI listing 150.

The geometric footprint may be calculated using various processes. For example, an outlining algorithm may be used to determine a polygon that encompasses all or a number of event location coordinates associated with the POI listing 150 that are within the predetermined distance. In another aspect, a convex hull may be calculated on the set of event location coordinates that are within the predetermined distance of the POI location coordinate. In still another aspect, the footprint module 330 may begin with the POI location coordinate (e.g., a latitude and longitude coordinate) for a POI listing 150 and generate an initial geometric footprint of the POI listing 150 using a first set of the closest event location coordinates. The footprint module 330 may gradually build out the geometric footprint using further sets of event location coordinates that are further and further away from the POI location coordinate.

In one aspect, the geometric footprints for POI listings 150 may be updated over time. For example, after a geometric footprint for a POI listing 150 is calculated and stored in the POI listing 150, the interface module 320 may continue to receive location sharing events 100 associated with the POI listing 150. The footprint module 330 may use these newly received location sharing events 100 to recalculate and update the geometric footprint for the POI listing 150.

In another aspect, the POI module 325 may modify the POI location coordinate of a POI listing based on received location sharing events 100. For example, the interface module 320 may receive a number of location sharing events 100 with associated with a POI listing 150 (e.g., the POI identifier in the location sharing events 100 match the unique identifier or name in the POI listing 150). The POI module 325 may detect that the event location coordinates of the location sharing events 100 are all beyond a predetermined distance from the POI location coordinate. Furthermore, the POI module 325 may detect that the event location coordinates of the location sharing events 100 are all near each other (e.g., within a second predetermined distance of one another). This may indicate that the event location coordinates in the location sharing events 100 are accurate and that the POI location coordinate in the POI listing 150 is inaccurate. Inaccuracies in the POI location coordinate in the POI listing 150 may occur when a POI, such as a business, closes a location, opens a new location, or moves from an old location to a new location.

If the POI module 325 detects a possible inaccuracy in the POI location coordinate in the POI listing 150, it may flag the POI location coordinate for as needing to be verified or it may update the POI location coordinate based on the received event location coordinates. For example, the footprint module 330 may calculate a geometric footprint based on the received event location coordinates and the POI module 325 may select a point within the geometric footprint as the new POI location coordinate and update the POI listing 150. In another aspect, the POI module 325 may select one of the event location coordinates (e.g., the most central event location coordinate) as the new POI location coordinate and update the POI listing 150 with the new POI location coordinate.

In another embodiment, the interface module 320 may receive a number of location sharing events 100 with a particular POI identifier, however the POI module 325 may not be able to identify a POI listing 150 based on the POI identifier. This may indicate that a POI listing 150 may not have been created for the POI for some reason (e.g., a new POI has appeared or a POI listing 150 for an existing POI was never entered into the database 335). If the number of location sharing events 100 with the particular POI identifier exceeds a threshold number of events and the event location coordinates of the location sharing events 100 are all within a threshold distance of one another, the POI module 325 may generate a flag indicating a possible need for a new POI listing 150 based on the POI identifier and the event location coordinates. In another embodiment, the interface module 320 may automatically generate a new POI listing 150 based on the POI identifier and the event location coordinates.

Figure 5:
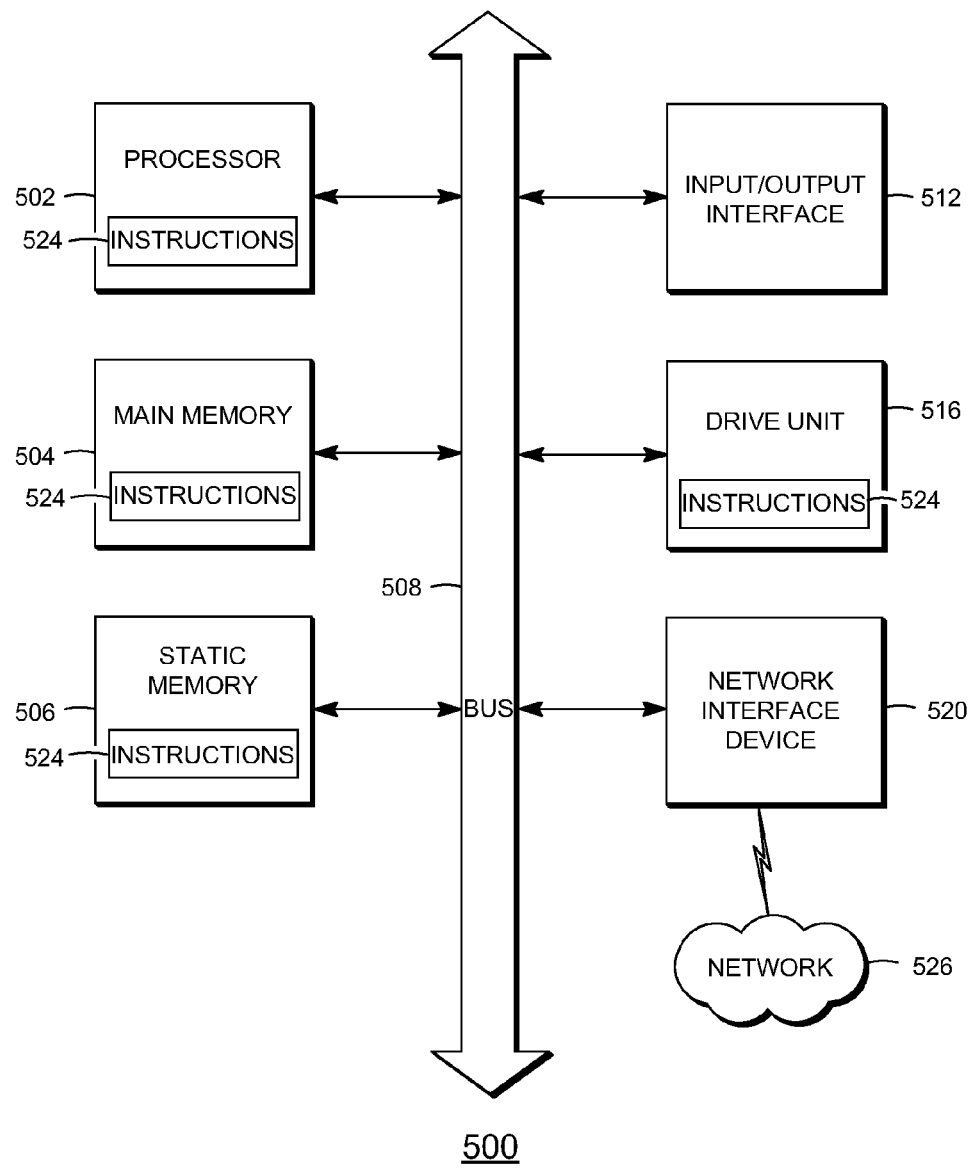
FIG. 5 is a conceptual block diagram illustrating a computer system with which each of the clients and servers of FIG. 3 may be implemented.

FIG. 5 is a block diagram illustrating a computer system with which any of the clients and servers of FIG. 3 may be implemented. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for identifying a geometric footprint of a point of interest (POI) based on location sharing events received from mobile devices are provided. The geometric footprint may be calculated based on the received location sharing events and stored in the POI listing for that POI. In one aspect, the geometric footprint may be further refined based on subsequently received location sharing events. In certain aspects, the system may include an interface module, a POI module, and a footprint module. The interface module may be configured to receive a location sharing event from a mobile device, the location sharing event including an event location coordinate and a POI identifier. The POI module may be configured to identify the POI listing in the database based on the POI identifier, the POI listing including a POI location coordinate. The footprint module may be configured to calculate a geometric footprint of the POI listing based on the event location coordinate and update the POI listing using the calculated geometric footprint.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for identifying a geometric footprint of a point of interest (POI) listing in a database, the method comprising:
   receiving a location sharing event from a mobile device, the location sharing event comprising an event location coordinate and a POI identifier;
   identifying the POI listing in the database based on the POI identifier, the POI listing comprising a POI location coordinate;
   comparing the event location coordinate to the POI location coordinate to determine if the event location coordinate is within a predetermined distance of the POI location coordinate; and
   calculating a geometric footprint of the POI listing based on the event location coordinate if the event location coordinate is within the predetermined distance of the POI location coordinate.

2. The method of claim 1, wherein the calculating of the geometric footprint of the POI listing based on the event location coordinate comprises using an outlining algorithm to determine a polygon that encompasses the event location coordinate.

3. The method of claim 1, wherein the location sharing event is associated with an event time, the method further comprising:
   calculating the geometric footprint of the POI listing based on the event location coordinate if the event time is within a predetermined period of time.

4. The method of claim 1, wherein a plurality of event location coordinates that include the event location coordinate of the location sharing event received from the mobile device are used to calculate the geometric footprint of the POI listing.

5. The method of claim 4, the method further comprising:
   identifying a subset of the plurality of event location coordinates that are the closest to the POI location coordinate.

6. The method of claim 1, further comprising:
   storing the geometric footprint in the POI listing.

7. The method of claim 1, further comprising:
   updating a geometric footprint in the POI listing based on the calculated geometric footprint.

8. The method of claim 1, further comprising:
   modifying the POI location coordinate of POI listing based on the event location coordinate.

9. A system for identifying a geometric footprint of a point of interest (POI) listing in a database, the system comprising:
   a memory;
   one or more processors;
   one or more modules stored in the memory and configured for execution by the one or more processors, the modules comprising:
      an interface module configured to receive a location sharing event from a mobile device, the location sharing event comprising an event location coordinate and a POI identifier;
      a POI module configured to identify the POI listing in the database based on the POI identifier, the POI listing comprising a POI location coordinate; and
      a footprint module configured to:
         calculate a geometric footprint of the POI listing based on the event location coordinate, and
         update the POI listing using the calculated geometric footprint.

10. The system of claim 9, wherein the footprint module is further configured to:
    compare the event location coordinate to the POI location coordinate to determine if the event location coordinate is within a predetermined distance of the POI location coordinate; and
    calculate the geometric footprint of the POI listing based on the event location coordinate if the event location coordinate is within the predetermined distance of the POI location coordinate.

11. The system of claim 9, wherein the footprint module is configured to calculate the geometric footprint of the POI listing based on the event location coordinate by generating a convex hull that encompasses the event location coordinate.

12. The system of claim 9, wherein the location sharing event is associated with a timestamp, and wherein the footprint module is configured to calculate the geometric footprint of the POI listing if the timestamp is during a predetermined time period.

13. The system of claim 9, wherein the footprint module is configured to calculate the geometric footprint of the POI listing based on a plurality of event location coordinates that include the event location coordinate of the location sharing event received from the mobile device.

14. The system of claim 9, wherein the POI module is configured to store the geometric footprint in the POI listing.

15. The system of claim 9, wherein the POI module is configured to update a geometric footprint in the POI listing based on the calculated geometric footprint.

16. The system of claim 9, wherein the POI module is configured to update the POI location coordinate of POI listing based on the event location coordinate.

17. A non-transitory machine-readable medium comprising instructions stored therein, which when executed by a machine, cause the machine to perform operations comprising:
    receiving a location sharing event from a mobile device, the location sharing event comprising an event location coordinate and a POI identifier;
    identifying the POI listing in the database based on the POI identifier, the POI listing comprising a POI location coordinate;
    generating a geometric footprint of the POI listing based on the event location coordinate; and
    associating the geometric footprint with the POI listing.

18. The non-transitory machine-readable medium of claim 17, the operations further comprising:
  comparing the event location coordinate to the POI location coordinate to determine if the event location coordinate is within a predetermined distance of the POI location coordinate; and
  wherein the geometric footprint of the POI listings is generated if the event location coordinate is within the predetermined distance of the POI location coordinate.

19. The non-transitory machine-readable medium of claim 17, wherein the location sharing event is associated with an event time, the operations further comprising generating the geometric footprint of the POI listing based on the event location coordinate if the event time is within a predetermined period of time.

20. The non-transitory machine-readable medium of claim 17, the operations further comprising:
  modifying the POI location coordinate of POI listing based on the event location coordinate.

* * * * *